(No Model.) 4 Sheets—Sheet 1.

P. J. KENT & W. F. BANCROFT.
WIRE NAIL MACHINE.

No. 439,665. Patented Nov. 4, 1890.

Witnesses
Chas. F. Schmelz,
H. M. Fowler.

Inventor
Prentiss J. Kent,
William F. Bancroft.
By their Attorney
Rufus B. Fowler (No Model.) 4 Sheets—Sheet 2.

P. J. KENT & W. F. BANCROFT.
WIRE NAIL MACHINE.

No. 439,665. Patented Nov. 4, 1890.

Witnesses
Chas. F. Schmelz,
H. M. Fowler.

Inventor
Prentiss J. Kent
William F. Bancroft.
By their Attorney
Rufus B. Fowler (No Model.) 4 Sheets—Sheet 3.

P. J. KENT & W. F. BANCROFT.
WIRE NAIL MACHINE.

No. 439,665. Patented Nov. 4, 1890.

Witnesses
Chas. F. Schmelz,
H. M. Fowler

Inventor
Prentiss J. Kent
William F. Bancroft,
By their Attorney
Rufus B. Fowler (No Model.) 4 Sheets—Sheet 4.
P. J. KENT & W. F. BANCROFT.
WIRE NAIL MACHINE.

No. 439,665. Patented Nov. 4, 1890.

Witnesses
Chas. F. Schmelz,
H. M. Fowler.

Inventors
Prentiss J. Kent,
William F. Bancroft,
By their Attorney
Rufus B. Fowler

United States Patent Office.

PRENTISS J. KENT AND WILLIAM F. BANCROFT, OF WORCESTER, MASSACHUSETTS.

WIRE-NAIL MACHINE.

SPECIFICATION forming part of Letters Patent No. 439,665, dated November 4, 1890.

Application filed January 21, 1888. Serial No. 261,541. (No model.)

*To all whom it may concern:*

Be it known that we, PRENTISS J. KENT and WILLIAM F. BANCROFT, citizens of the United States, residing at Worcester, in the county of Worcester and State of Massachusetts, have invented certain new and useful Improvements in Wire-Nail Machines, of which the following is a specification, reference being had to the accompanying drawings, illustrating those parts of a machine for making wire nails embodying my invention, and in which—

Figure 1:
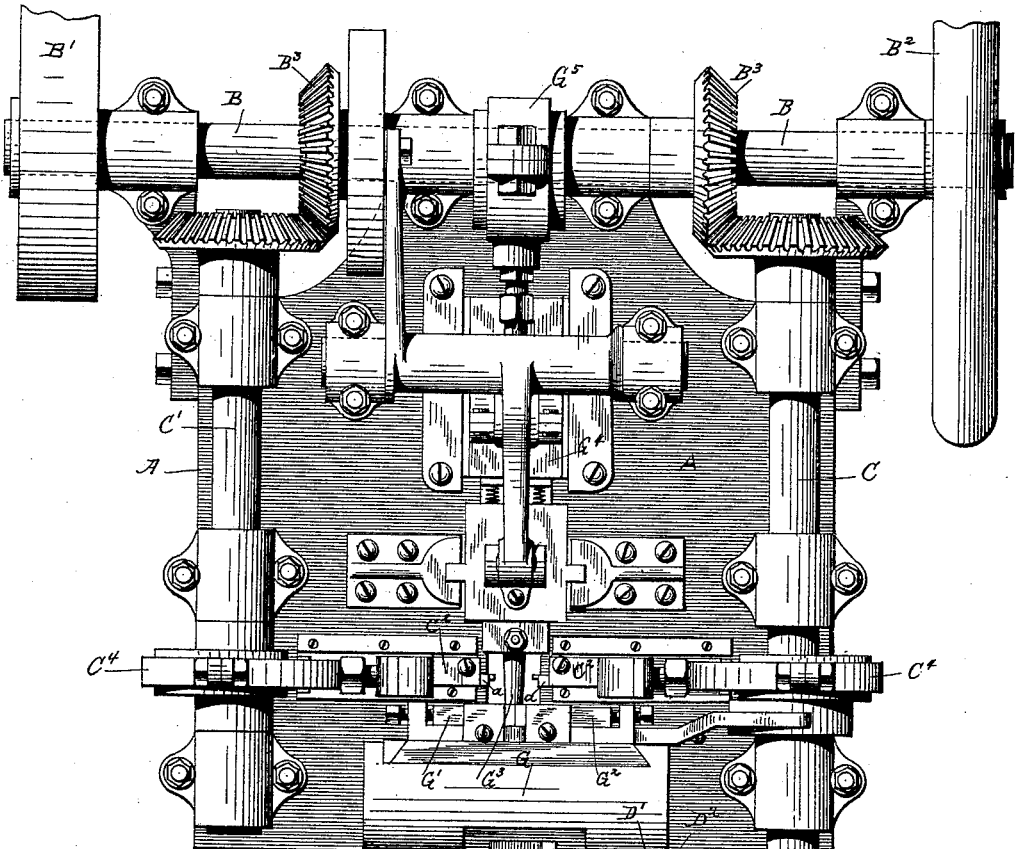
Figure 2:
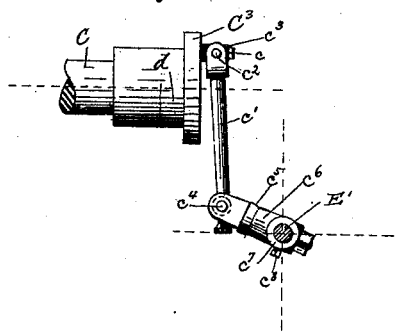
Figure 3:
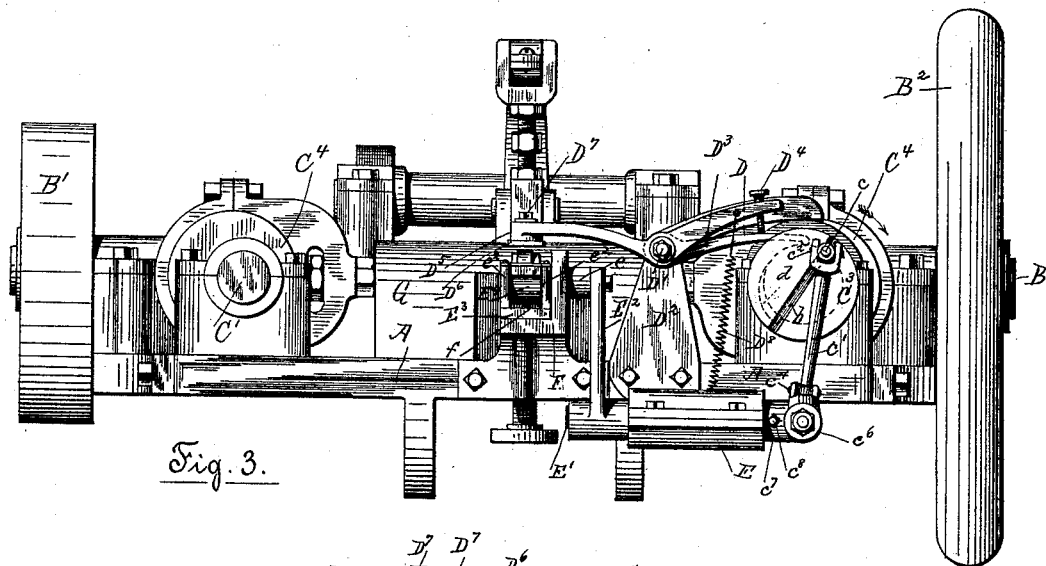
Figure 4:
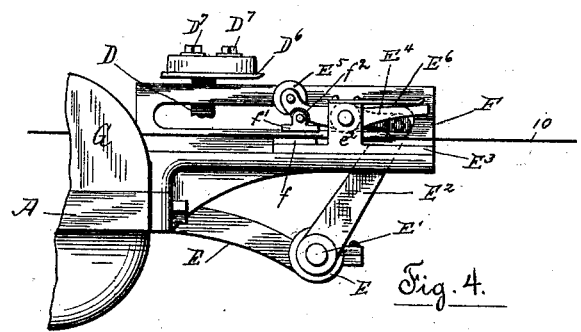
Figure 5:
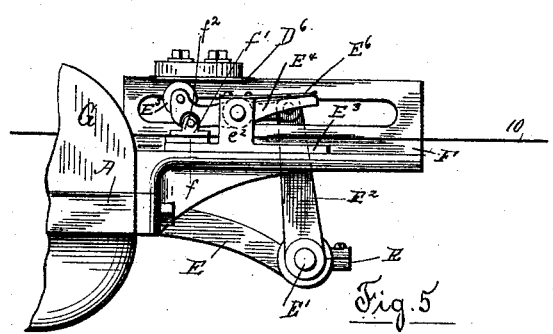
Figure 6:
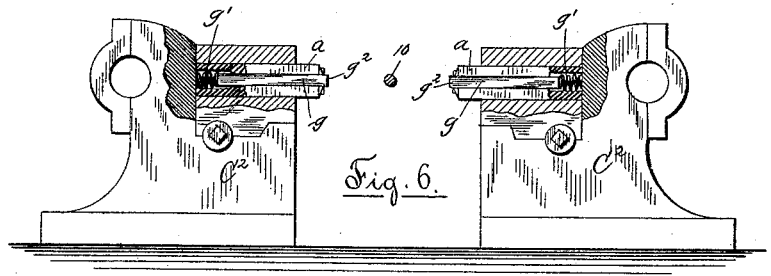
Figure 7:
Figure 8:
Figure 9:
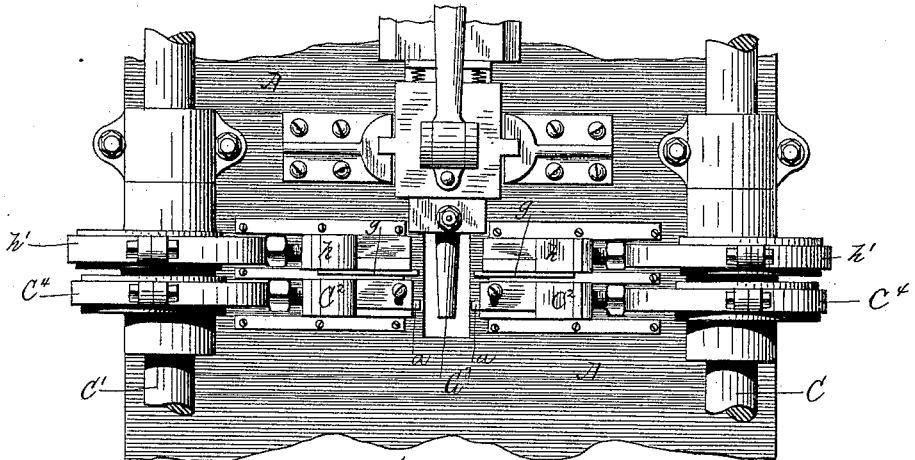
Figure 10:
Figure 11:
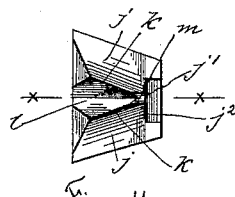
Figure 12:
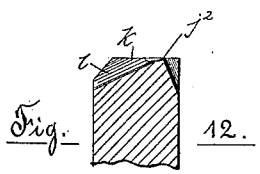
Figure 13:
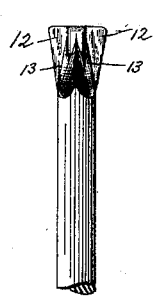
Figure 14:
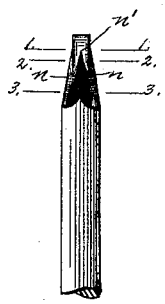
Figure 15:
Figure 16:
Figure 17:
Figure 18:

Figure 1 represents a top view of my improved wire-nail machine. Fig. 2 is a detached view of a portion of the mechanism for actuating the feeding mechanism. Fig. 3 is an end view of the machine, showing the end at which the feeding mechanism is located. Figs. 4 and 5 show side views of the wire-gripping dies by which the wire is fed to the machine, the two figures showing the dies at opposite ends of their reciprocating movement. Fig. 6 represents the nail-gripping dies and the nail-pointing dies, with the die-holding reciprocating blocks partly in section. Figs. 7 and 8 show, respectively, rear and side views of one of the nail-pointing dies having a steel bar attached thereto, which serves as a nail-gripping die. Fig. 9 is a top view of a portion of the machine, showing two independently-actuated pairs of dies for pointing the nail and for gripping the nail. Figs. 10 and 11 are rear and end views of one of the nail-pointing dies. Fig. 12 is a sectional view of one of the nail-pointing dies on line X X, Fig. 11. Fig. 13 is a view of a nail-point as made by the dies shown in Figs. 10, 11, and 12, with the "wings" undetached from the point. Figs. 14 and 15 represent side and edge views of the nail-point. Fig. 16 is a sectional view of the nail-point on line 1 1, Fig. 14. Fig. 17 is a sectional view on line 2 2, Fig. 14; and Fig. 18 is a sectional view on line 3 3, Fig. 14.

Similar letters refer to like parts in the several views.

Our invention relates to machines for making wire nails; and it consists in providing means for feeding the wire to the nail-making mechanism, by which the nail is headed and pointed; in the conformation of the dies by which the point of the nail is formed; in providing means whereby the nail is held from any lateral or longitudinal movement during the time in which the point is being formed; and it further consists in the construction and arrangement of the several parts of the mechanism by which the objects of our invention are effected, as hereinafter described, and set forth in the claims.

In Fig. 1 of the drawings the top view of a machine for making wire nails is shown. The major part is, however, not concerned in our present invention, and is therefore not shown or described in detail.

A A denotes the table, upon which the operating parts of the machine are supported.

B is the main driving-shaft of the machine, with a belt-pulley B', balance-wheel $B^2$, and bevel-gears $B^3$ $B^3$, by which rotary motion is imparted to the shafts C C'. Sliding blocks $C^2$ have a reciprocating motion along ways on the table A, carrying the nail-pointing dies $a$ $a$, by which the nail is severed from a continuous strip of wire and the point formed at the same time in the usual and well-known manner in machines of this class. Upon the end of the shaft C is a disk-wheel $C^3$, having a T-shaped slot $b$ passing diametrically across its face, in which is fastened a crank-pin $c$, and upon the hub of the disk-wheel $C^3$ is a cam projection $d$, by which the end of the lever D is actuated.

The mechanism for feeding the wire to the machine is shown in top view in Fig. 1 and in end view in Fig. 3. Journaled in bearings in a bracket E, attached to the main framework of the machine, is a rocking shaft E', to which a rocking motion is imparted through connecting mechanism by means of the rotating disk-wheel $C^3$ and crank-pin $c$. This connecting mechanism consists in the machine shown in the accompanying drawings of the pitman-rod $c'$, bifurcated at its upper end, forming two prongs in which are journaled the gudgeons $c^2$, extending from a sleeve $c^3$, which turns on the crank-pin $c$. The lower end of the pitman-rod $c'$ is provided with gudgeons $c^4$, which are journaled in the prongs of the bifurcated spindle $c^5$, which is journaled in a block $c^6$, attached to the end of the rocking shaft E' by means of a hub $c^7$ and setscrew $c^8$. The sleeve $c^3$ has a rocking motion on the crank-pin $c$, and the bifurcated pitman-rod $c'$ and spindle $c^5$ are capable of a slight rocking motion on the gudgeons $c^2$ and $c^4$, respectively, thereby permitting the several parts of the mechanism to accommodate themselves to any change in position as would be accomplished by means of ball-and-socket joints. From the shaft $E'$ a radial arm $E^2$ extends upwardly and connected by a link $e$ with a stud $e'$ in the wire-carriage $E^3$, thereby imparting a reciprocating motion to the wire-carriage $E^3$ along the L-shaped way F, attached at one end to the table A of the machine. The wire-carriage $E^3$ has two lugs $e^2$ extending upwardly, between which the lever $E^4$ is pivoted midway its length, having a friction-roll $E^5$ journaled in one end and with the opposite end held down in the normal position of the lever by means of a blade-spring $E^6$, attached to the upper ends of the lugs $e^2$ and extending over the end of the lever $E^4$.

The wire-carriage is provided with a pair of wire-gripping dies, by which the wire is seized as the wire-carriage is moved forward or toward the nail-machine, causing the wire to be carried along a distance sufficient to form a nail. These dies are shown at $f f'$, $f$ being a a fixed die, attached to the wire-carriage, and $f'$ an opposing die, having lugs $f^2$, which are pivoted to the lever $E^4$, so as to allow a slight rocking motion to the pivoted die, in order that its lower surface may assume a position parallel to the lower or fixed die at any position of the lever $E^4$. The lever D is hung upon a stud $D'$ in the bracket $D^2$, attached to the table A, and pivoted on the stud $D'$ is a lever $D^3$, extending beneath one end of the lever D, which is provided with an adjusting-screw $D^4$. The opposite end of the lever D is provided with a slot $D^5$, the end being enlarged for the purpose, and to the lower side of the slotted end of the lever D is a plate $D^6$, attached to the lever D by screws $D^7$, passing through the slot $D^5$, permitting the plate $D^6$ to be laterally adjustable in a line parallel with the line of motion of the wire-carriage $E^3$. The end of the lever $D^3$ rests upon the cam $d$, and the adjusting-screw $D^4$ is held in contact with the lever $D^3$ by a spring $D^8$, attached to the bracket E.

The wire (shown at 10, Figs. 4 and 5) passes between the lugs $e^2$ and also between the gripping-dies $f f'$, and the operation of feeding the wire to the nail-making mechanism is as follows: The motion of the cam $d$ is so timed with reference to the reciprocating motion of the wire-carriage $E^3$ that the cam projection $d$ is brought beneath the end of the lever $D^3$, thereby depressing the slotted end of the lever D and carrying the plate $D^6$ down into the path of the roll $E^5$, causing the lever $E^4$ to be rocked and the wire 10 to be clamped between the opposing surfaces of the wire-gripping dies $f f'$ and carried along with the carriage $E^3$. As the wire-carriage arrives at the end of its forward movement, or in the position shown in Fig. 5, the cam projection $d$ passes from beneath the end of the lever $D^3$, allowing the friction-plate $D^6$ to be raised by the action of the spring $D^8$ and the wire-gripping dies $f f'$ to be instantly opened by means of the blade-spring $E^6$, allowing the wire-gripping dies to slide over the wire during the backward movement of the wire-carriage $E^3$. As the seizure of the wire is determined by the plate $D^6$, the length of wire fed to the machine is easily varied by the lateral adjustment of the plate $D^6$, in the manner already described. The wire as it is fed to the machine passes through a hole in the "anvil" or heavy block G, which in the drawings forms an integral part of the table A and is held between a pair of gripping-dies, which are shown at $G'$ $G^2$. The head is formed upon the end of the wire, as it is held by the gripping-dies by means of a reciprocating header $G^3$, which is carried forward with a blow upon the end of the wire by the reciprocating block or ram $G^4$, actuated by the eccentric $G^5$ on the main shaft B. The nail is severed from the wire and the point formed by a pair of dies $a$ $a$ in the sliding blocks $C^2$, having a reciprocating movement along ways on the table A by means of the eccentrics $C^4$ $C^4$. This method of forming a wire nail, as well as the construction and operation of the several parts required to accomplish the same, are well known, and as they form no part of our present invention we have not herein described or shown the same in detail, except so far as the form and operation of the cutting and pointing dies are concerned.

The above-enumerated operations are common to most or all of the nail-machines now in use, and they have heretofore been generally deemed sufficient for the purpose of forming a nail from a continuous strip of wire. We, however, add one other—viz., that of gripping the body of the nail itself during the period that the point is being formed and the nail severed from the wire. This may be accomplished in many ways which will be familiar to those conversant with the art of making wire nails, three such ways being illustrated in Figs. 6, 7, 8, and 9 of the drawings. As shown in Fig. 6, the rear sides of the cutting-dies $a$ $a$ are grooved and a sliding bar $g$ inserted in the groove with a stiff spiral spring $g'$ placed behind the sliding bar, by which the outer end $g^2$ of the bar is held in its normal position, projecting a short distance beyond the end of the cutting-die $a$. As the cutting-dies $a$ $a$ approach the wire, (represented at 10,) the projecting ends $g^2$ of the nail-gripping dies are first brought in contact with the wire, and by the continued forward movement of the cutting-dies the springs $g'$ are compressed, causing the ends $g^2$ of the gripping-dies to firmly seize the wire and hold it in alignment with the continuous strip of wire, and also prevent any longitudinal movement of the wire caused by the strain upon the wire by the cutting and pointing dies.

In Figs. 7 and 8 the gripping-bars are attached to the rear side of the cutting-dies with the ends of the cutting-dies slightly in advance of the bars forming the gripping-dies, so that the gripping-dies are brought in contact with the nail just before the nail is severed from the continuous strip of wire, the nail being held while the point is being formed and up to the time of separation by the metal which, in the operation of swaging the point, is pressed out laterally, and which are known as "wings," and which are shown at 12 12 in Fig. 13. In Fig. 9 the nail-gripping dies are carried by an independent pair of blocks $h\ h$, actuated by the eccentrics $h'\ h'$ on the shafts C C', the wire-gripping dies having a similar reciprocating motion to the wire cutting and pointing dies, their actuating-eccentrics being set to operate the cutting and pointing dies slightly in advance of the gripping-dies. We do not, however, confine ourselves to the specific methods, as shown in the drawings, for effecting the gripping of the nail, such being only a few of the many ways which will be known to those familiar with the construction of this class of machines.

The peculiar form of cutting and pointing die, forming a part of our present invention, is shown in Figs. 10 to 12, and further illustrated by the additional Figs. 13 to 18, showing the shape of the nail-point as made by our improved dies. As the two cutting-dies are duplicates of each other, but one is shown in the accompanying drawings. The die consists of a bar of steel with its end beveled at $j\ j$ and also at $j'$, forming cutting-edges at $k\ k$ by means of an acute-angled groove $l$ in the central section of the bar. The body of the wire is swaged between the faces of the opposing dies and compressed into the angular recess formed by the acute-angled grooves $l$, the excess of metal being crowded laterally outward, forming the wings 12 12, Fig. 13, which are finally cut off as the dies approach on the lines 13 13, Fig. 13, and compressing the point held in the angular groove $l$ into a pyramidal form. The beveled portion $j'$ forms a cutting-edge $j^2$, by which the wire is severed and the nail separated from the continuous strip. At the portion of the die at $m$, Fig. 11, which would otherwise form the apex of the pyramidal point, we recess the die, as shown, in the proper form to flatten the point or to change the shape from the pyramidal to a cuneiform point, the edge formed by the cutting-edges $k\ k$ forming a sharp cutting or knife edge $n$ the entire length of the nail-point. The pyramidal form is carried upon the flattened surface, as shown at $n'$, Fig. 14, forming a sharp point, which aids the nail in finding its way through the wood. The sharp edges $n$ at the sides of the point serve to sever the grain of the wood as the nail is driven, and the flattened point gives all the advantages of the chisel-pointed nail.

We are aware that chisel-pointed nails have been heretofore made. Such we do not herein claim.

What we do claim as of our invention, and desire to secure by Letters Patent, is—

1. In the feeding mechanism of a wire-nail machine, the combination of a carriage having a reciprocating motion through connected operating mechanism, substantially as described, a fixed wire-gripping die attached to said carriage, a lever pivoted on said carriage, a wire-gripping die attached to said lever, a plate arranged in the path of said pivoted lever, whereby said dies are closed by the contact of said pivoted lever and said plate, and a spring applied to said pivoted lever for the purpose of opening said wire-gripping dies, substantially as described.

2. In the wire-feeding mechanism of a nail-machine, the combination, with a reciprocating wire-carriage carrying wire-gripping devices, of a pivoted lever, an adjustable plate attached to said lever, and an actuating-cam by which a vibratory motion is imparted to said lever, whereby its attached plate is alternately brought into the path of said wire-carriage for the purpose of closing said wire-gripping devices upon the wire, substantially as described.

3. In a wire-feeding mechanism of a nail-machine, the combination, with a reciprocating wire-carriage having wire-gripping devices by which the wire is seized and carried during the forward movement of the wire-carriage, of a pivoted lever having a vibratory motion and carrying a friction-plate at one end, an actuating-cam by which said lever is operated and said friction-plate brought into the path of said wire-gripping devices, a retractile spring applied to said lever, by which it is removed from contact with the wire-gripping devices, and means, substantially as described, whereby said friction-plate is adjusted with reference to the wire-gripping devices, substantially as described.

4. In the feeding mechanism of a nail-machine, the combination, with a reciprocating wire-carriage, of a fixed wire-gripping die attached to said carriage, a lever pivoted on said carriage, and a die pivoted on said pivoted lever, so that the face of said pivoted die shall align itself with the strand of wire to be seized by said dies, substantially as described.

5. The combination, with a reciprocating wire-carriage carrying wire-gripping devices, of a lever D, plate $D^6$, attached to said lever, lever $D^3$, adjusting-screw $D^4$, spring $D^8$, and actuating-cam $d$, substantially as described.

6. The combination of reciprocating wire-carriage $E^3$, fixed die $f$, attached to said carriage, lever $E^4$, pivoted on said carriage in lugs $e^2$ and having a friction-roll $E^5$, die $f'$, pivoted on lever $E^4$, and blade-spring $E^6$, substantially as described.

7. The combination of a reciprocating wire-carriage $E^3$, fixed die $f$ attached to said wire-carriage, lever $E^4$, pivoted in lugs on said carriage, die $f'$, pivoted on said lever $E^4$, blade-spring E⁶, friction-plate D⁶, attached to a vibrating lever, a vibrating lever D, and an actuating-cam d, substantially as described.

8. The combination, in a wire-nail machine, with the mechanism for pointing the nail and severing it from the continuous strand of wire, of a pair of gripping-dies for gripping the body of the nail and holding it from lateral displacement while the nail is being severed from the strand of wire, said gripping-dies having a yielding pressure upon the nail by means of actuating mechanism, substantially as described.

9. The combination of a pair of wire-gripping dies for seizing the body of the nail during the operation of pointing, said dies having a reciprocating motion through connected operating mechanism, substantially as described, and yielding springs interposed between said dies and their actuating mechanism, as and for the purpose described.

10. In a nail-machine, a pair of cutting and pointing dies, said dies being provided with a recess for conjointly swaging the point of the nail, said recess being angular for a portion of its extent, so as to form a pyramidal point next the body of the nail, and said recess being cuneiform in the remainder of its extent, so as to form a chisel-shaped extremity to the point, said recess being bounded by cutting-edges, whereby the material not required to form the swaged point is cut off, and said dies having a cutting-edge placed at right angles to the axis of the die by which the nail is severed from the strand of wire, the cutting-faces of said dies being so formed as to form a nail-point presenting a flattened cutting-edge or chisel-point and having a pyramidal section between the body of the nail and said chisel-point with two of the angles carried upon the flattened sides of said flattened point, as at $n'$, substantially as described.

11. The combination, with a reciprocating carriage, of wire-gripping devices carried by said carriage and a plate placed in the path of said wire-gripping devices, whereby they are closed upon the wire by means of their contact with said plate, substantially as described.

PRENTISS J. KENT.
WILLIAM F. BANCROFT.

Witnesses.
RUFUS B. FOWLER,
CHAS. F. SCHMELZ.